US005548995A

United States Patent [19]

Clinton et al.

[11] Patent Number: 5,548,995

[45] Date of Patent: Aug. 27, 1996

[54] METHOD AND APPARATUS FOR DETECTING THE ANGULAR POSITION OF A VARIABLE POSITION CAMSHAFT

[75] Inventors: Eric L. Clinton, Southfield; Hsien C. Pao, Plymouth; William R. Allen, Redford; Valerian M. Nita, Warren, all of Mich.

[73] Assignee: Ford Motor Company, Dearborn, Mich.

[21] Appl. No.: 155,508

[22] Filed: Nov. 22, 1993

[51] Int. Cl.$^{6}$ .......... G01M 15/00

[52] U.S. Cl. .......... 73/116; 73/117.3; 364/431.01

[58] Field of Search .......... 73/116, 117.1, 73/117.2, 117.3; 364/431.01, 431.07

[56] References Cited

U.S. PATENT DOCUMENTS

| | | | |
|---|---|---|---|
| 4,338,813 | 7/1982 | Hunninghaus et al. | 73/116 |
| 4,483,184 | 11/1984 | Kunzfeld | 73/117.2 |
| 4,924,830 | 5/1990 | Abe | 73/117.3 |
| 5,117,784 | 6/1992 | Schechter et al. | 123/90.17 |
| 5,165,271 | 11/1992 | Stepper et al. | 73/116 |
| 5,182,943 | 2/1993 | Fukui et al. | 73/116 |
| 5,209,202 | 5/1993 | Maurer et al. | 123/414 |
| 5,245,968 | 9/1993 | Kolias et al. | 123/414 |
| 5,309,757 | 5/1994 | Hashimoto et al. | 73/116 |

FOREIGN PATENT DOCUMENTS

| | | |
|---|---|---|
| 2236872 | 4/1991 | United Kingdom . |
| 2276956 | 10/1994 | United Kingdom . |

*Primary Examiner*—Richard E. Chilcot, Jr.
*Assistant Examiner*—George M. Dombroske
*Attorney, Agent, or Firm*—Peter Abolins; Roger L. May

[57] ABSTRACT

A VRS sensor detects the angular rotation of a variable position camshaft which rotates in a variable relationship to a crankshaft, and transmits a Variable Cam Timing/Cylinder IDentification signal, representative of the position of the angular rotation of the camshaft, to an electronic engine controller (EEC). A profile ignition pickup (PIP) sensor detects the rotation of the crankshaft and transmits a PIP signal, representative of the rotation of the crankshaft to the EEC. The EEC receives the VCT/CID signal and the PIP signal and identifies the position of a first firing cylinder in a predetermined sequence of cylinder firing and determines the angular position of the camshaft in relation to the crankshaft by detecting the varying time duration between VCT/CID signals and PIP signals.

19 Claims, 15 Drawing Sheets

METHOD AND APPARATUS FOR DETECTING THE ANGULAR POSITION OF A VARIABLE POSITION CAMSHAFT

FIELD OF THE INVENTION

This invention relates to methods and apparatus for detecting the relative positions of cams on a variable position camshaft and for identifying a first firing cylinder in a predetermined sequence of cylinder firing.

BACKGROUND OF THE INVENTION

Variable cam timing systems operate to vary the timing between the camshaft and the crankshaft to optimize engine operation over the entire range of engine operation. Systems such as that described in U.S. Pat. No. 5,117,784 to Schechter et al., vary the timing between the camshaft and crankshaft to achieve improved idle stability, expanded torque curve and the RPM (revolutions per minutes) range of the engine, full control of emission gases and elimination of certain emissions, and elimination of external exhaust gas recirculation components and circuitry.

In order to achieve the above mentioned benefits, the exact position of the camshaft must be known in order to alter fuel control and ignition timing in response to the changing angular position of the camshaft. Known engine control systems operate on the assumption that the camshaft and crankshatft are in a fixed relation to one another. Moreover, known systems require at least one crankshaft revolution after engine crank to identify a first firing cylinder in a predetermined sequence of cylinder firing. Consequently, sequential fuel injection is not initiated until after engine crank when the first firing cylinder is identified.

Accordingly, there exists a need for a system which can detect, during engine operation, the angular position of a camshaft which varies in relation to a crankshaft in order to achieve the above mentioned advantages of a variable position camshaft. In addition there also exists a need to identify the first firing cylinder in a predetermined sequence of cylinder firing in order to initiate sequential fuel injection during engine crank.

SUMMARY OF THE INVENTION

It is an object of the present invention to achieve improved engine operation over an entire range of engine operation by detecting a first firing cylinder in a predetermined sequence of cylinder firing during engine crank and by detecting and calculating the angular position of a camshaft and storing or transmitting such information for use by an engine control system in determining ignition and fuel control parameters.

In accordance with the primary object of the invention, in a preferred embodiment, a pulsewheel, comprising a plurality of teeth and positioned on a camshaft rotates in fixed relation to the camshaft. A profile ignition pickup (PIP) sensor generates an engine position signal comprising a first series of pulse indicative of the rotational speed of the engine and a VRS or Hall type sensor detects the angular rotation of the teeth on the pulsewheel and the position of a predetermined cylinder within said engine and generates a cam position signal comprising a second series of pulses, each pulse being generated when the pulsewheel rotates by a predetermined angle as determined by the positions of the teeth. An electronic engine controller receives the first and second series of pulses, identifies the position of the first firing cylinder in a predetermined sequence of firing (cylinder number one) and calculates the angular position of the camshaft in relation to the crankshaft.

An advantage of certain preferred embodiments is that by knowing the angular position of the camshaft, ignition and fuel control parameters may be more accurately controlled, thus resulting in improved idle stability, expanded torque curve and the RPM range of the engine, full control of emission gases and elimination of certain emissions, and elimination of external exhaust gas recirculation components and circuitry. An added advantage is that reduced cost and increased reliability is achieved by integrating the hardware required to detect the angular position of the camshaft along with the hardware required to detect the position of cylinder number one. An additional advantage is that the cylinder position is detected within three teeth rotation of the pulsewheel, thus enabling sequential fuel injection to begin much sooner than in conventional systems.

These and other features and advantages of the present invention may be better understood by considering the following detailed description of a preferred embodiment of the invention. In the course of this description, reference will frequently be made to the attached drawings.

DETAILED DESCRIPTION

Figure 1:
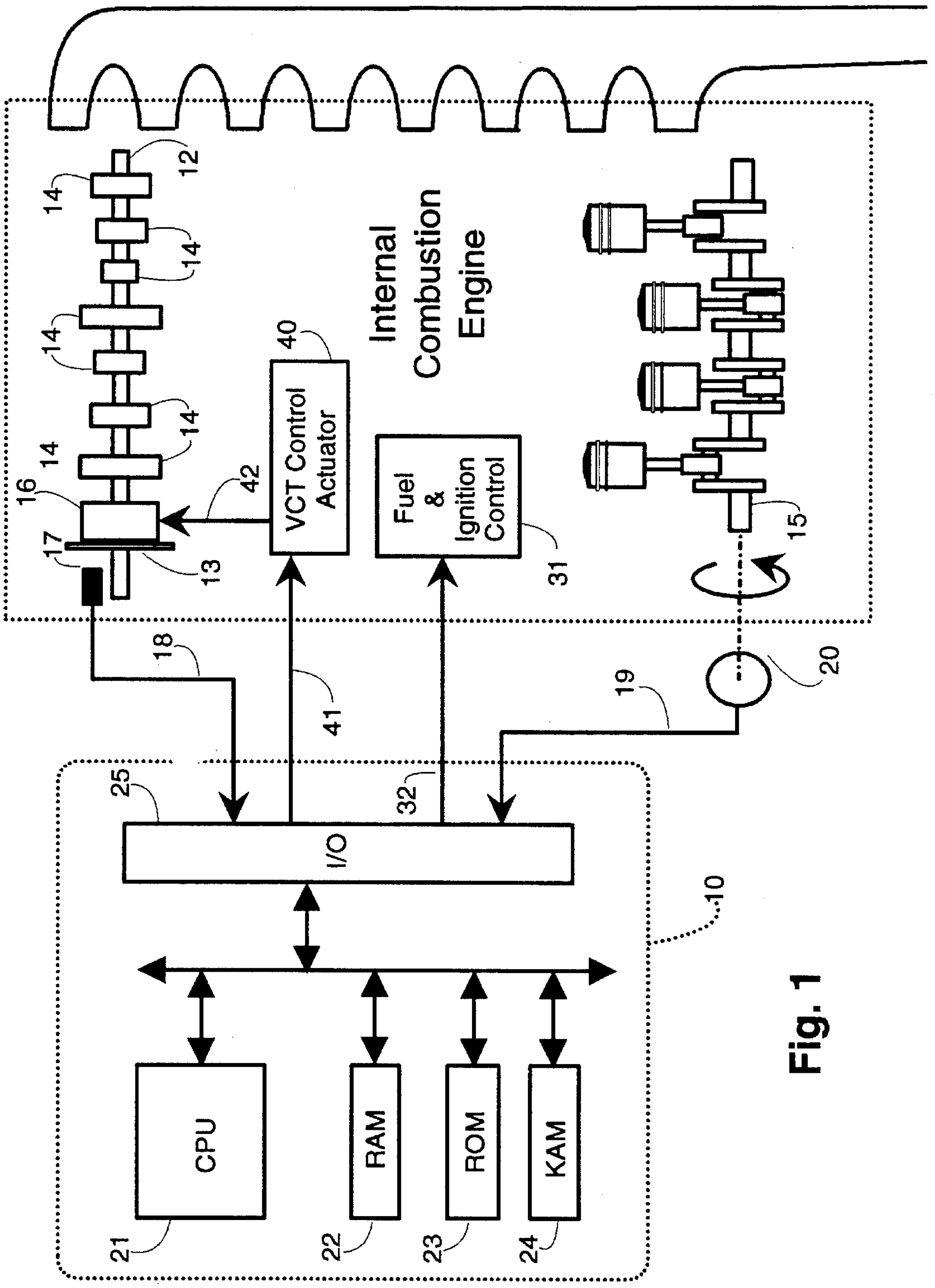
FIG. 1 of the drawings shows a portion of an internal combustion engine and electronic engine controller which embody the principles of the invention.

In FIG. 1 of the drawings an internal combustion engine comprises a variable position camshaft 12 capable of altering the positional relationship of cams 14 to crankshaft 15. Such a variable position camshaft is described in U.S. Pat. No. 5,117,784 to Schechter et al. FIG. 1 shows for explanation purposes a single variable position camshaft. It is understood that engines utilizing either an in-line cylinder configuration or a V-type cylinder configuration may utilize multiple camshafts of the type shown in FIG. 1. A pulsewheel 13 positioned on a drive gear 16 of the camshaft 12 comprises teeth (seen in FIGS. 2(*a–b*), 3(*a–b*) and 4(*a*)) positioned in fixed relationship to the cams 14 on the camshaft 12. A VRS sensor 17, of known type, detects the angular rotation of the teeth on the pulsewheel 13 as the camshaft rotates and generates a representative Variable Cam Timing/Cylinder Identification (VCT/CID) signal 18. VCT control actuator 40 receives control signal 41 from EEC 10 and generates a camshaft control signal 42 used to control the angular position of cams 14 relative to crankshaft 15. A profile ignition pickup (PIP) sensor 20 generates a PIP signal 19 indicative of the rotational speed of the crankshaft 15.

An electronic engine control (EEC) module 10 comprises a central processing unit 21, a read-only memory (ROM) 23 for storing control programs, a random-access memory (RAM) 22 for temporary data storage, a keep-alive-memory (KAM) 24 for storing learned values and a conventional data bus. The EEC 10 receives the VCT/CID signal 18, the PIP signal 19 and generates control signals 32 to control the amount of fuel injected by injectors within the engine, and control the firing of an air/fuel mixture within the combustion chambers of the engine. The EEC 10 also controls the relationship of the two input signals 18, and 19 through the output signal 41 from the EEC, to the VCT control actuator 40.

Figures 2A, 2B, 2C, 2D, 2E:
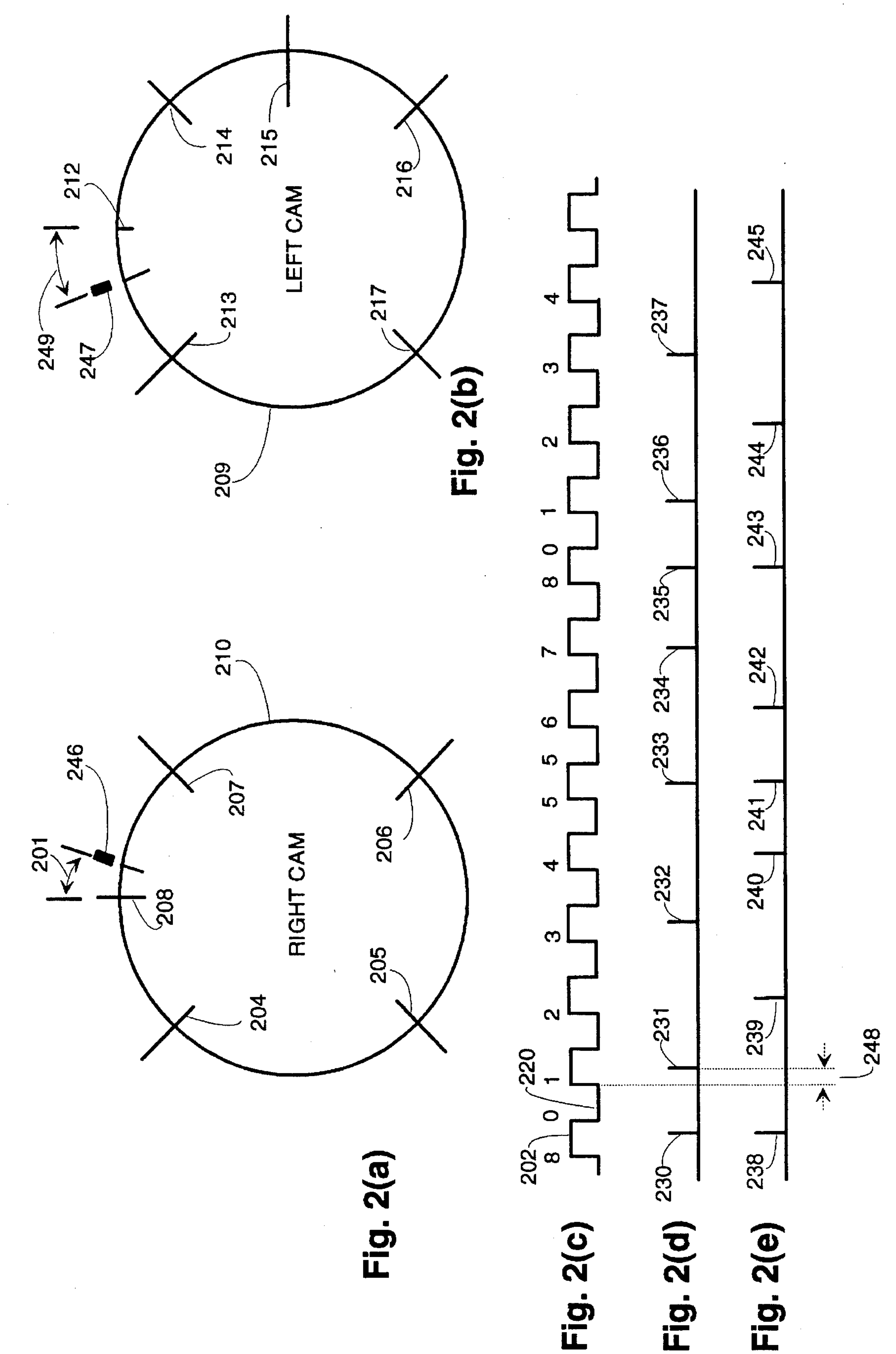
FIGS. 2(*a–e*), 3(*a–e*), and 4(*a–c*) show alternative embodiments of a pulse wheel and associated timing diagrams.

FIGS. 2(*a–e*), 3(*a–e*) and 4(*a–c*) show alternative embodiments of pulsewheel 13 along with a timing diagram of the pulsetrain generated by the VRS sensor 17 (FIGS. 2(*d,e*), 3(*d,e*) and 4(*c*)) in relation to the pulsetrain generated by PIP sensor 20 (FIGS. 2(*c*), 3(*c*) and 4(*b*)). For the pulsewheels shown in FIGS. 2(*a,b*), 3(*a,b*) and 4(*c*), the rotation of the pulsewheel shown is understood to be in a clockwise direction. FIGS. 2(*a*) and 2(*b*) show pulsewheels 210 and 209 utilized respectively on a right camshaft and left camshaft in a V-8 engine. In another embodiment, pulsewheel 210 or 209 may be used singularly in an in-line four cylinder engine.

Pulsewheel 210, positioned on the right camshaft, comprises five teeth 204, 205, 206, 207 and 208. Tooth 208, herein termed a cylinder identification (CID) tooth, indicates upon rotation past VRS sensor 246, the position of a first firing cylinder in a predetermined sequence of cylinder firing for the right bank of cylinders. Sensor 246, of a type similar to sensor 17 in FIG. 1, in a preferred embodiment for the right cam is positioned at a known angle in relation to cylinder one top dead center (TDC), as designated at 201. In a preferred embodiment, sensor 246 is positioned 24 degrees from TDC. Teeth 204, 205, 206 and 207, herein termed variable cam timing (VCT) teeth, upon rotation past sensor 246 result in a pulse being generated which indicates the relative angular position of camshaft 12 and consequently the relative angular positions of cams 14. Teeth 208, 204, 205, 206 and 207 are preferably positioned, respectively, at angles of 45, 90, 90, 90 and 45 degrees relative to one another.

Pulsewheel 209 shown in FIG. 2(*b*) and positioned on the left camshaft comprises five teeth with CID tooth shown at 215 and VCT teeth at 213, 214, 216 and 217. Teeth 215, 214, 213, 217 and 216 on left pulsewheel 209, have the same position, starting from CID tooth 215, of 45, 90, 90, 90 and 45 degrees relative to one another, as the teeth on the right pulsewheel 210. VRS sensor 247, of a type similar to sensor 17 in FIG. 1, is positioned at a known angle in relation to TDC. In a preferred embodiment, sensor 247 is positioned 18 degrees BTDC as shown at 249.

FIGS. 2(*c*), 2(*d*) and 2(*e*) show, respectively, the pulsetrain generated by PIP sensor 20 and by VRS sensors 246 and 247 positioned to detect the rotation of teeth respectively on the right and left camshafts. FIG. 2(*c*) shows a pulsetrain comprising fixed length pulses 202, generated by PIP sensor 20, which vary in frequency in direct proportion to engine speed. PIP sensor 20 generates a pulse 202 for each rotation of crankshaft 15. The numbers shown above the pulsetrain designate the firing of a particular cylinder which occurs either before or after the rising edge of the PIP signal. As can be seen, the pulsetrain shown in FIG. 2(*c*) depicts an engine operating under steady state conditions.

FIGS. 2(*d*) and 2(*e*) show, respectively, a variable cam timing/cylinder identification (VCT/CID) pulsetrain generated by VRS sensors 246 and 247 positioned respectively on the right and left camshaft of a V-8 engine. In FIG. 2(*d*), pulses 230 through 237 designate respectively the rotation of teeth 208, 204, 205, 206, 207, 208, 204 and 205 past VRS sensor 246. In FIG. 2(*e*), pulses 238 through 245 designate respectively, the rotation of teeth 213, 217, 216, 215, 214, 213, 217 and 216 past VRS sensor 247.

In a V-8 engine utilizing a five tooth pulsewheel for each camshaft, the embodiment shown in FIGS. 2(*a–e*) will advantageously detect the number of PIP pulses 202 which occur between pulses in the VCT/CID pulsetrain generated by sensors 246 and 247, in order to detect which pulses are caused by the rotation of a VCT tooth past sensor 246 or 247 and which pulses are caused by the rotation of a CID tooth. Teeth which are positioned 45 degrees relative to one another will cause a pulse to be generated for every PIP pulse 202. Teeth which are positioned 90 degrees relative to one another will cause a pulse to be generated every other PIP pulse. Consequently, in FIG. 2(*d*), VCT/CID pulses 230 through 237 can be attributed to the rotation of a particular tooth on pulsewheel 210 past sensor 246 by detecting the VCT/CID pulses along with the PIP pulses, determining the number of PIP pulses between each VCT/CID pulse and attributing a pulse to a tooth on pulsewheel 210. A similar identification can be performed for the VCT/CID pulses 238 through 245 shown in FIG. 2(*e*). In this manner, a preferred embodiment can identify the CID tooth which represents the firing of a first firing cylinder in a predetermined sequence of cylinder firing (cylinder number one) by detecting the rotation of three VCT/CID teeth past sensor 246 or 247 either singly or in combination.

Time duration 248 indicates the angular position of the camshaft relative to the crankshaft as will be discussed in the description accompanying FIGS. 5(*a–b*), 6, 7(*a–d*) and 8(*a–d*). A preferred embodiment of the present invention advantageously determines the angular position of camshaft 12 by detecting the time duration 248 between the rising edge of a PIP pulse 202 and the occurrence of a VCT/CID pulse.

Figures 3A, 3B, 3C, 3D, 3E:
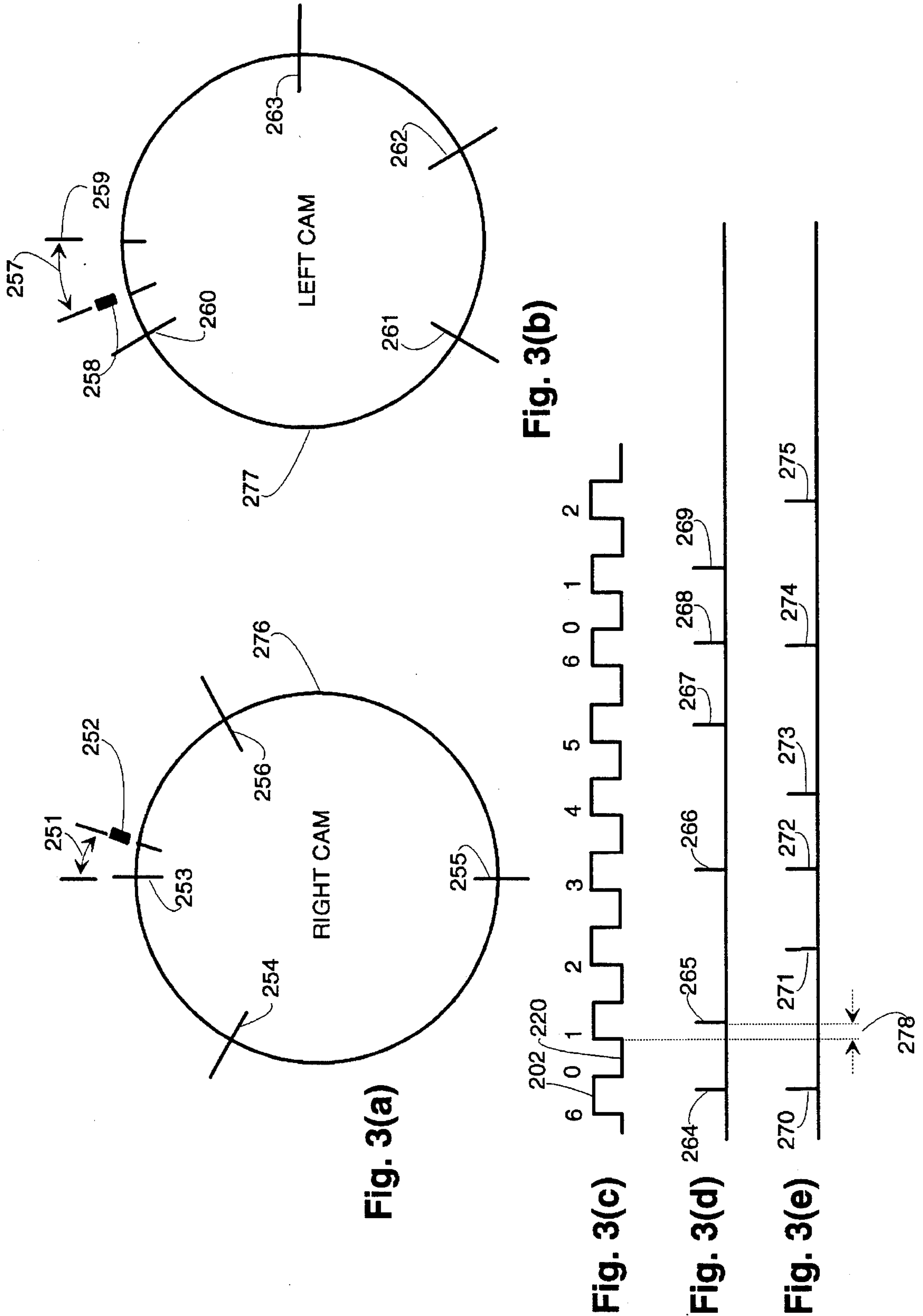

FIGS. 3(*a*) and 3(*b*) show respectively pulsewheels 276 and 277 utilized respectively on a right camshaft and left camshaft in a V-6 engine. Pulsewheel 276 positioned on the right camshaft comprises four teeth 253, 254, 255 and 256, with tooth 253 being the CID tooth, and teeth 254, 255 and 256 being VCT teeth. VRS sensor 252, of a type similar to sensor 17 in FIG. 1, in the embodiment shown in FIG. 3(*a*) is advantageously positioned at a known angle in relation to TDC. In a preferred embodiment sensor 252 is positioned 24 degrees TDC. Teeth 253, 254, 255 and 256 are preferably positioned, respectively, at angles of 60, 120, 120 and 60 degrees relative to one another.

Pulsewheel 277 shown in FIG. 3(*b*) and positioned on the left camshaft of a V-6 engine comprises four teeth, with CID tooth shown at 262 and VCT teeth at 260, 261 and 263. The four teeth on left pulsewheel 277 have the same position, starting from CID tooth 262, of 60, 120, 120 and 60 degrees relative to one another, as the teeth on right pulsewheel 276. VRS sensor 258, of a type similar to sensor 17 in FIG. 1, is preferably positioned at a known angle in relation to TDC. In a preferred embodiment sensor 258 is positioned 18 degrees TDC.

FIGS. 3(*c*), 3(*d*) and 3(*e*) show, respectively, the pulsetrain generated by PIP sensor 20 and by VRS sensors 252 and 258 positioned to detect the rotation of teeth on the right and left camshafts respectively. FIG. 3(*c*) shows a pulsetrain generated by PIP sensor 20. The numbers shown above the pulsetrain designate the firing of a particular cylinder which occurs upon the rising edge of the PIP signal. As can be seen, the pulsetrain shown in FIG. 3(*a*) depicts an engine operating under steady state conditions.

FIGS. 3(*d*) and 3(*e*) show, respectively, a variable cam timing/cylinder identification (VCT/CID) pulsetrain generated by VRS sensors 252 and 258 positioned respectively on the right and left camshaft of a V-6 engine. In FIG. 3(*d*), pulses 264 through 269 designate respectively the rotation of teeth 253, 254, 255, 256, 253 and 254 past VRS sensor 252. In FIG. 3(*e*), pulses 270 through 275 designate respectively, the rotation of teeth 260, 261, 262, 263, 260 and 261 past VRS sensor 258.

In a V-6 engine utilizing a four tooth pulsewheel for each camshaft, the embodiment shown in FIGS. 3(*a–e*) will advantageously detect the number of PIP pulses 202 which occur between pulses in the VCT/CID pulsetrain generated by sensors 252 and 258, in order to detect which pulses are caused by the rotation of a VCT tooth past sensor 252 or 258 and which pulses are caused by the rotation of a CID tooth. Teeth which are positioned 60 degrees relative to one another will cause a pulse to be generated for every PIP pulse 202. Teeth which are positioned 120 degrees relative to one another will cause a pulse to be generated every other PIP pulse. Consequently, in FIG. 3(*d*), VCT/CID pulses 264 through 269 can be attributed to the rotation of a particular tooth on pulsewheel 276 past sensor 252 by detecting the VCT/CID pulses along with the PIP pulses, determining the number of PIP pulses between each VCT/CID pulse and attributing a pulse to a tooth on pulsewheel 276. A similar identification can be performed for the VCT/CID pulses 270 through 275 shown in FIG. 3(*e*). In this manner, a preferred embodiment can identify the CID tooth which represents the firing of a first firing cylinder in a predetermined sequence of cylinder firing (cylinder number one) by detecting the rotation of three VCT/CID teeth past sensor 252 or 258 either singly or in combination.

Time duration 278 indicates the angular position of the camshaft relative to the crankshaft as will be discussed in the description accompanying FIGS. 5(*a–b*), 6, 7(*a–d*) and 8(*a–d*). A preferred embodiment of the present invention advantageously determines the angular position of camshaft 12 by detecting the time duration 278 between the rising edge of a PIP pulse 202 and the occurrence of a VCT/CID pulse.

Figure 4A:
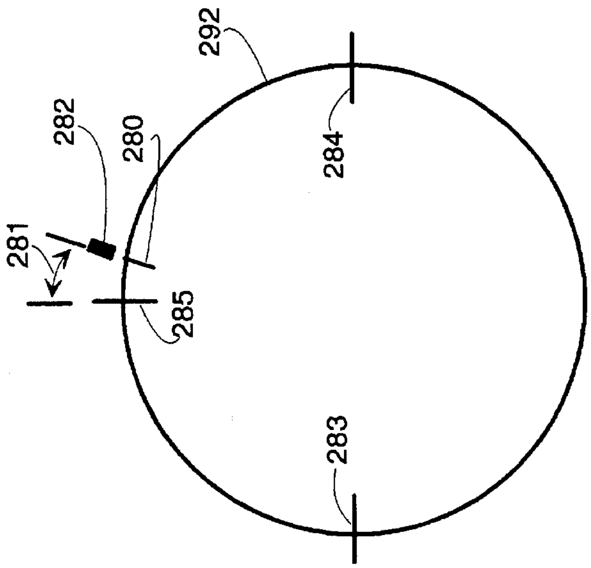
Figure 4B:
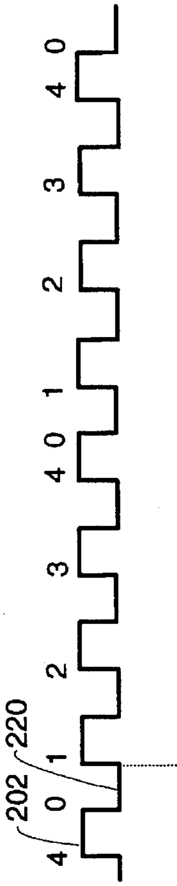
Figure 4C:
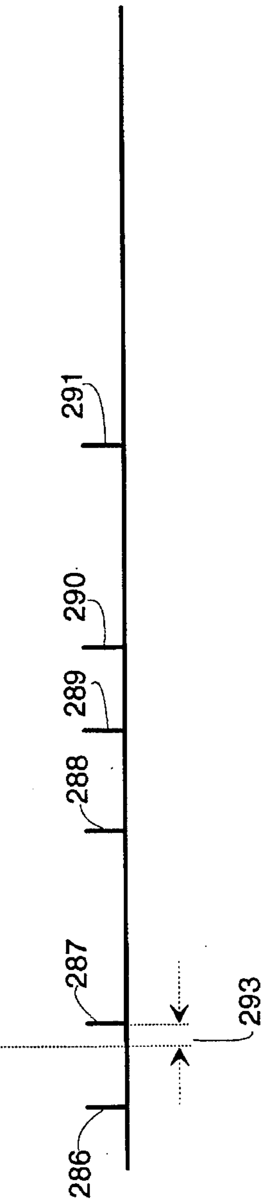

FIG. 4(*a*) shows a pulsewheel 292 on a camshaft contained in an in-line four cylinder engine. Pulsewheel 292 comprises three teeth 283, 284 and 285, with tooth 285 being the CID tooth, and teeth 283 and 284 being VCT teeth. VRS sensor 282 in the embodiment shown in FIG. 4(*a*) is advantageously positioned at a known angle in relation to TDC. In a preferred embodiment, sensor 282 is positioned 12 degrees TDC. Teeth 285, 283 and 284 are preferably positioned, respectively, at angles of 90, 180 and 90 degrees relative to one another.

FIGS. 4(*b*) and 4(*c*) show, respectively, the pulsetrain generated by a PIP sensor 20 and by VRS sensor 282 positioned to detect the rotation of teeth on pulsewheel 292. FIG. 4(*b*) shows a pulsetrain generated by PIP sensor 20. The numbers shown above the pulsetrain designate the firing of a particular cylinder which occurs either before or after the rising edge of the PIP signal. As can be seen, the pulsetrain shown in FIG. 4(*b*) depicts an engine operating under steady state conditions.

FIG. 4(*c*) shows a variable cam timing/cylinder identification (VCT/CID) pulsetrain generated by VRS sensor 282 positioned on the block of an in-line four cylinder engine. In FIG. 4(*c*), pulses 286 through 291 designate respectively the rotation of teeth 285, 284, 283, 285, 284 and 283 past VRS sensor 282.

In an in-line four cylinder engine utilizing a three tooth pulsewheel, the embodiment shown in FIGS. 3(*a–e*) will advantageously detect the number of PIP pulses 202 which occur between pulses in the VCT/CID pulsetrain generated by sensor 282, in order to detect which pulses are caused by the rotation of a VCT tooth past sensor 282 and which pulses are caused by the rotation of a CID tooth. Teeth which are positioned 90 degrees relative to one another will cause a pulse to be generated for every PIP pulse 202. Teeth which are positioned 180 degrees relative to one another will cause a pulse to be generated every other PIP pulse. Consequently, in FIG. 4(*c*), VCT/CID pulses 286 through 291 can be attributed to the rotation of a particular tooth on pulsewheel 292 past sensor 282 by detecting the VCT/CID pulses along with the PIP pulses, determining the number of PIP pulses between each VCT/CID pulse and attributing a pulse to a tooth on pulsewheel 292. In this manner, a preferred embodiment can identify the CID tooth which represents the firing of a first firing cylinder in a predetermined sequence of cylinder firing (cylinder number one) by detecting the rotation of three VCT/CID teeth past sensor 282.

Time duration 293 indicates the angular position of the camshaft relative to the crankshaft as will be discussed in the following description. A preferred embodiment of the present invention advantageously determines the angular position of camshaft 12 by detecting the time duration 293 between the rising edge of a PIP pulse 202 and the occurrence of a VCT/CID pulse.

Figure 5A:
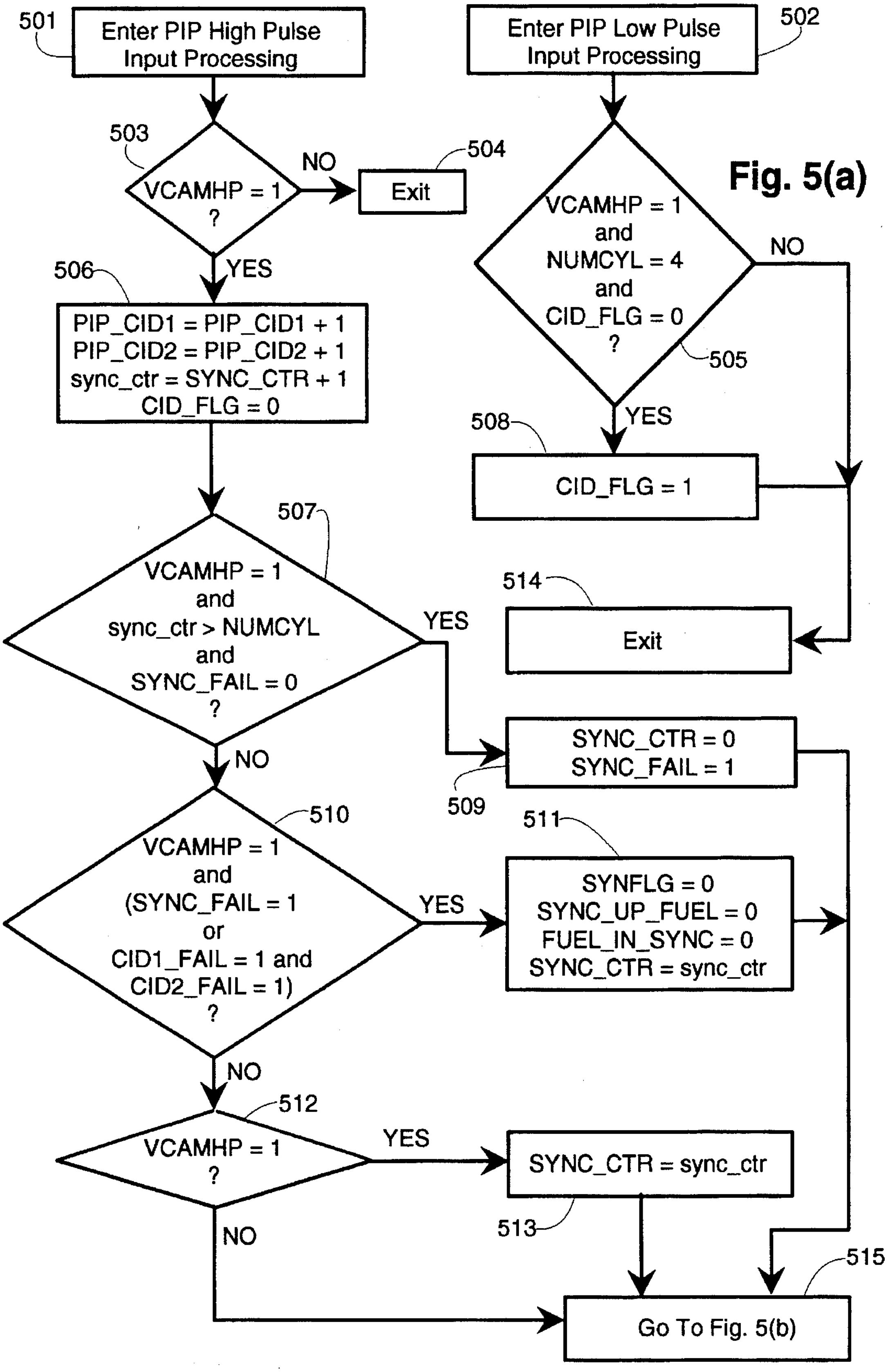
FIGS. 5(*a*), 5(*b*), 6, 7(*a*), 7(*b*), 7(*c*), 7(*d*), 8(*a*), 8(*b*), 8(*c*) and 8(*d*) are flowcharts showing the operation of a preferred embodiment of the invention.
Figure 5B:
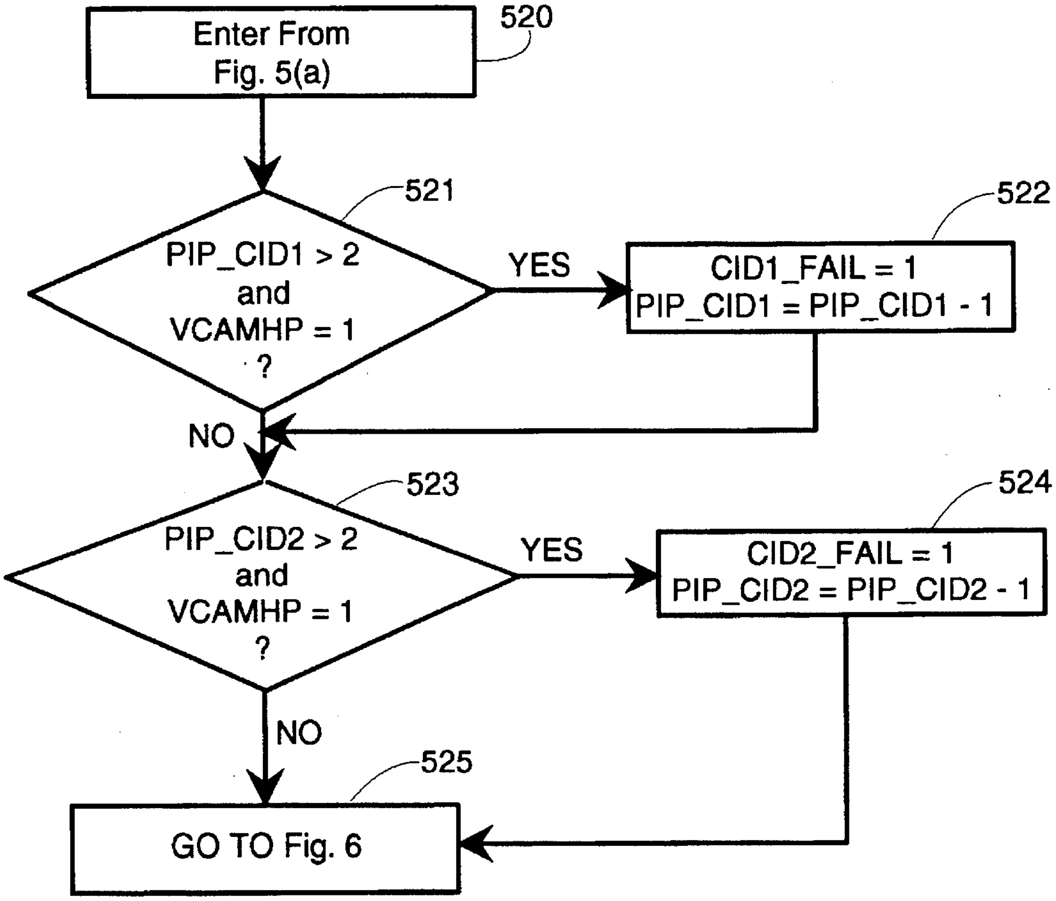

FIGS. 5(*a,b*), 6, 7(*a–d*) and 8(*a–d*) are flowcharts showing the operation of a preferred embodiment for an in-line four cylinder, a V-6 or a V-8 cylinder engine. The steps shown in FIGS. 5(*a,b*), 6, 7(*c–d*) and 8(*a–d*) may also be used on other types of engines such as an in-line 6, in-line 8 or a V-10 engine. The steps shown in FIGS. 5(*a,b*), 6, 7(*a–d*) and 8(*a–d*) are preferably implemented as interrupt driven routines which are stored in the ROM 23 and executed by CPU 21 upon the detection of the rising edge of PIP pulse 202. Unless specifically designated otherwise in the following description, the steps shown in FIGS. 5(*a,b*), 6, 7(*a–d*) and 8(*a–d*) are executed for all of the embodiments described in FIGS. 2(*a–e*), 3(*a–e*) or 4(*a–c*).

The steps shown in FIGS. 5(*a*) and 5(*b*) are preliminary steps which are executed to ensure that the VCT/CID hardware is operating properly and that proper synchronization of fuel has been achieved with each PIP pulse 202. The steps shown in FIG. 5(*a*) count the number of PIP pulses for a variable cam timing (VCT) engine. The manner in which the PIP pulses are counted in FIG. 5(*a*) is different if the engine in question is a V-6 or V-8 or an in-line four. If the engine is a V-6 or V-8 then the entry point is at 501 and at 503 a calibration constant VCAMHP, which indicates whether VCT hardware is present in the engine, is tested. VCAMHP is preferably a binary value with a value of one indicating that VCT hardware is present. If VCAMHP is found to not equal one then the routine is exited at 504. Once the conditions in steps 507, 510 and 512 are checked then the steps shown in FIGS. 5(*b*), 6, 7(*a–d*) and 8(*a–d*) are executed.

If the engine is an in-line four then the entry point is at 502 when the rising edge of the PIP pulse 202 is high. At 505 two calibration constants, VCAMHP and NUMCYL, and a bit flag CID_FLG are tested. VCAMHP is as described above, and NUMCYL is a constant indicating the number of cylinders in the engine. CID_FLG is a bit flag which, when set to a value of one indicates that a falling edge of PIP pulse 202 has occurred and that the pulse detected on the VCT/CID input is a CID pulse. If the conditions shown at 505 are not all true then it is determined that the pulse detected on the VCT/CID input is not a CID pulse and the routine is exited at 514.

At 506, three registers PIP_CID1, PIP and sync_ctr are incremented and bit flag CID_FLG is set to zero. PIP_CID1 and PIP_CID2 are registers used as counters which are used to count the number of PIP pulses which occur between VCT/CID pulses. PIP_CID1 is used to count PIP pulses for the right bank and PIP_CID2 is used to count PIP pulses for the left bank. In a four-cylinder engine either PIP_CID1 or PIP_CID2 is used depending on whether the VCT/CID sensor is installed on an intake camshaft or an exhaust camshaft respectively. For a single cam engine, only PIP_CID1 is used. In a V-6, SYNC_CTR will count from one to six as each cylinder fires and then will be reset to a value of zero and the process will be repeated. A similar process will occur for an in-line four or V-8 with the count value changing depending on the number of cylinders in the engine.

At 507 and 510 a variety of comparisons is made to ensure proper operation of the VCT/CID hardware. VCAMHP, SYNC_CTR and NUMCYL are as previously described, and SYNC_FAIL is a bit flag which is set to a value of one if the value in SYNC_CTR is determined to exceed the value of NUMCYL. If the conditions shown in 507 are true then at 509 SYNC_CTR is set to a value of zero, SYNC_FAIL is set to one and the routine proceeds to execute the steps shown in FIG. 5(*b*).

Otherwise, at 510, a second series of tests will be performed. VCAMHP and SYNC_FAIL are as described above and CID1_FAIL and CID2_FAIL are bit flags which are set to a value of one if the CID tooth on the pulsewheel has not been identified. In a V-type engine, CID1_FAIL indicates a failure for the right bank and CID2_FAIL indicates a failure for the left bank. In an in-line engine only one of the bit flags is utilized. In particular, during engine crank, CID1_FAIL and CID2_FAIL will have a value of one while the preferred embodiment processes the incoming PIP and VCT/CID pulses to determine the location of the first firing cylinder, cylinder number one in the engine. Before cylinder number one is identified, sequential fuel injection will be disabled and fuel delivery will occur to all cylinders simultaneously rather than sequentially.

The preferred embodiment of the present invention advantageously identifies the location of the first firing cylinder within the first rotation of the crankshaft 15, thus allowing sequential fuel injection to begin during engine crank. The first firing cylinder is identified within detection of the first three pulses generated by the VCT/CID sensors. In an engine with multiple camshafts, such as a V-type or dual camshaft engine, the location of the first firing cylinder is determined within the detection of a total of three VCT/CID pulses received from either or both of the VCT/CID sensors. SYNFLG which is set to zero at 511 indicates if register SYNC_CTR is not properly aligned with the last firing cylinder. SYNC_FAIL will have a value of zero if SYNC_CTR is properly aligned and a value of one otherwise. SYNC_UP_FUEL is a bit flag which indicates a fuel synchronization request to other routines contained in ROM 11 if set to a value on one. FUEL_IN_SYNC is a bit flag which indicates that fuel delivery is synchronized with the PIP pulse.

At 512, VCAMHP is tested once again and if VCT/CID hardware is found to be present then SYNC_CTR is updated to the value contained in sync_ctr, and the routine is continued in FIG. 5(*b*). At 521, PIP_CID1 is tested and if found to be greater than two then CID1_FAIL is set and PIP_CID1 is decremented. As discussed in the explanation accompanying FIGS. 2(*a–e*), 3(*a–e*) and 4(*a–c*) a VCT/CID pulse will occur every PIP pulse or every other PIP pulse. Consequently, if PIP_CID1 is greater than two, then an error has occurred and CID1_FAIL is set to one. At steps 523 and 524 a similar procedure is conducted for the left bank of the engine and control passes to the steps shown in FIG. 6.

Figure 6:
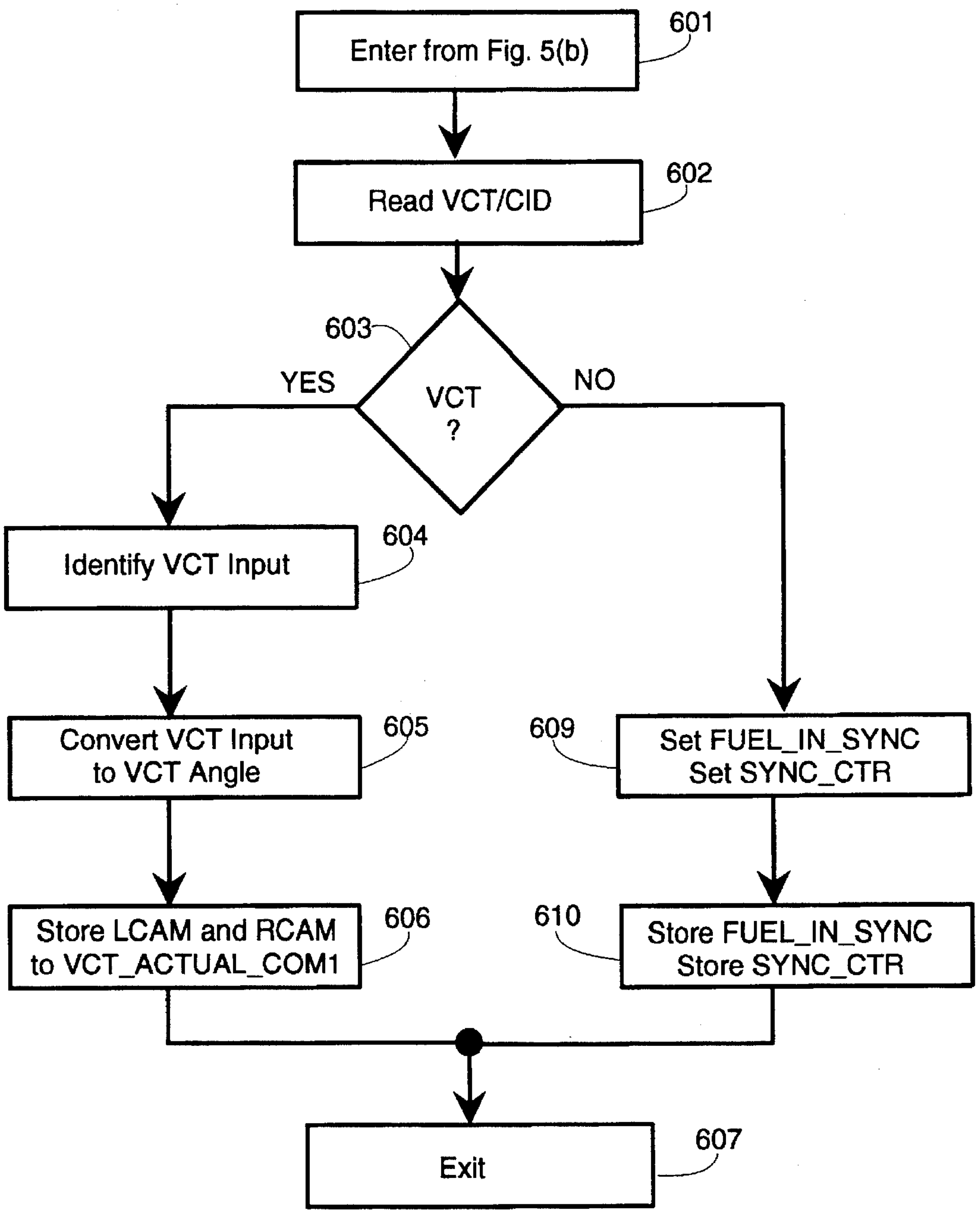
Figure 7A:
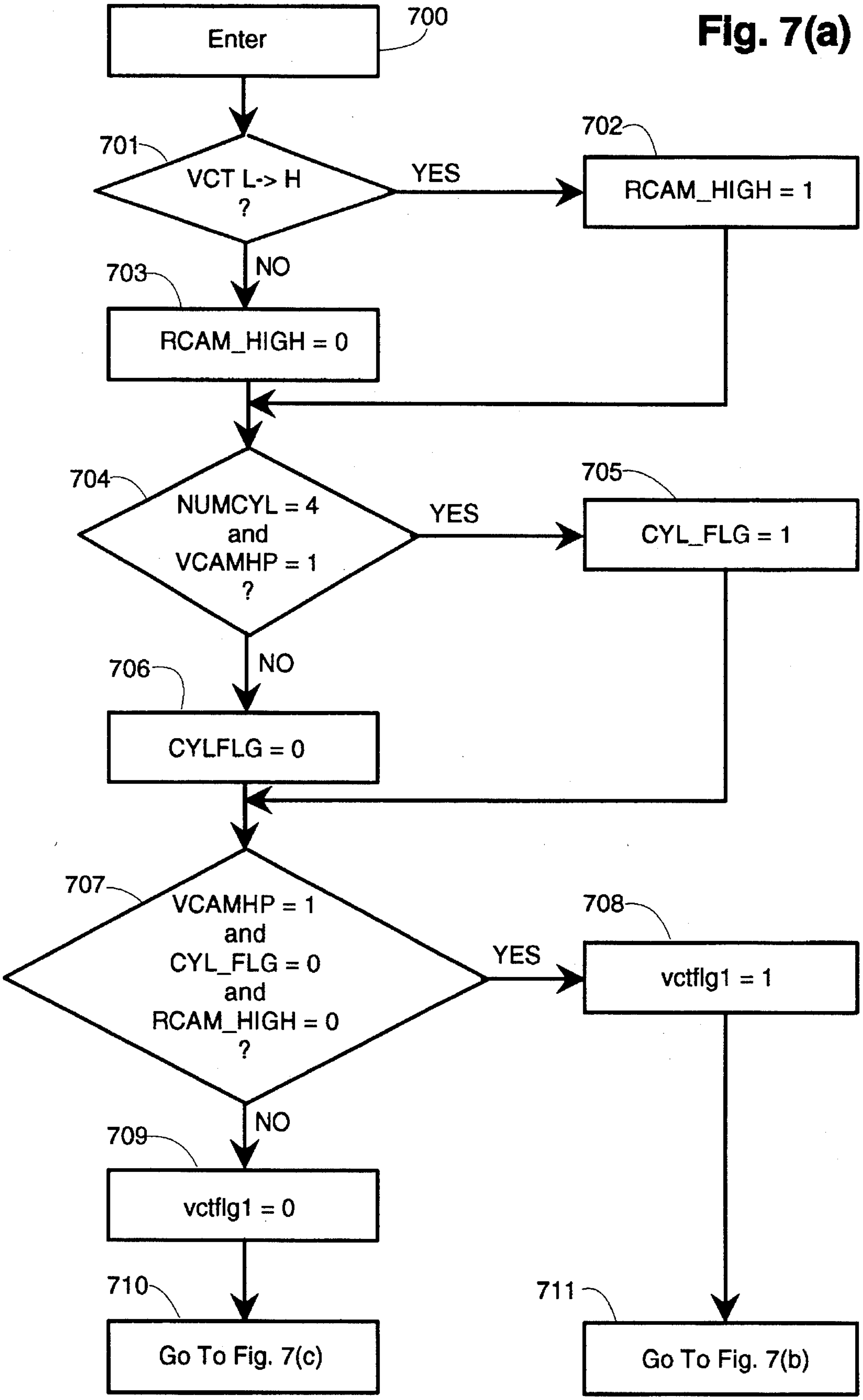
Figure 7B:
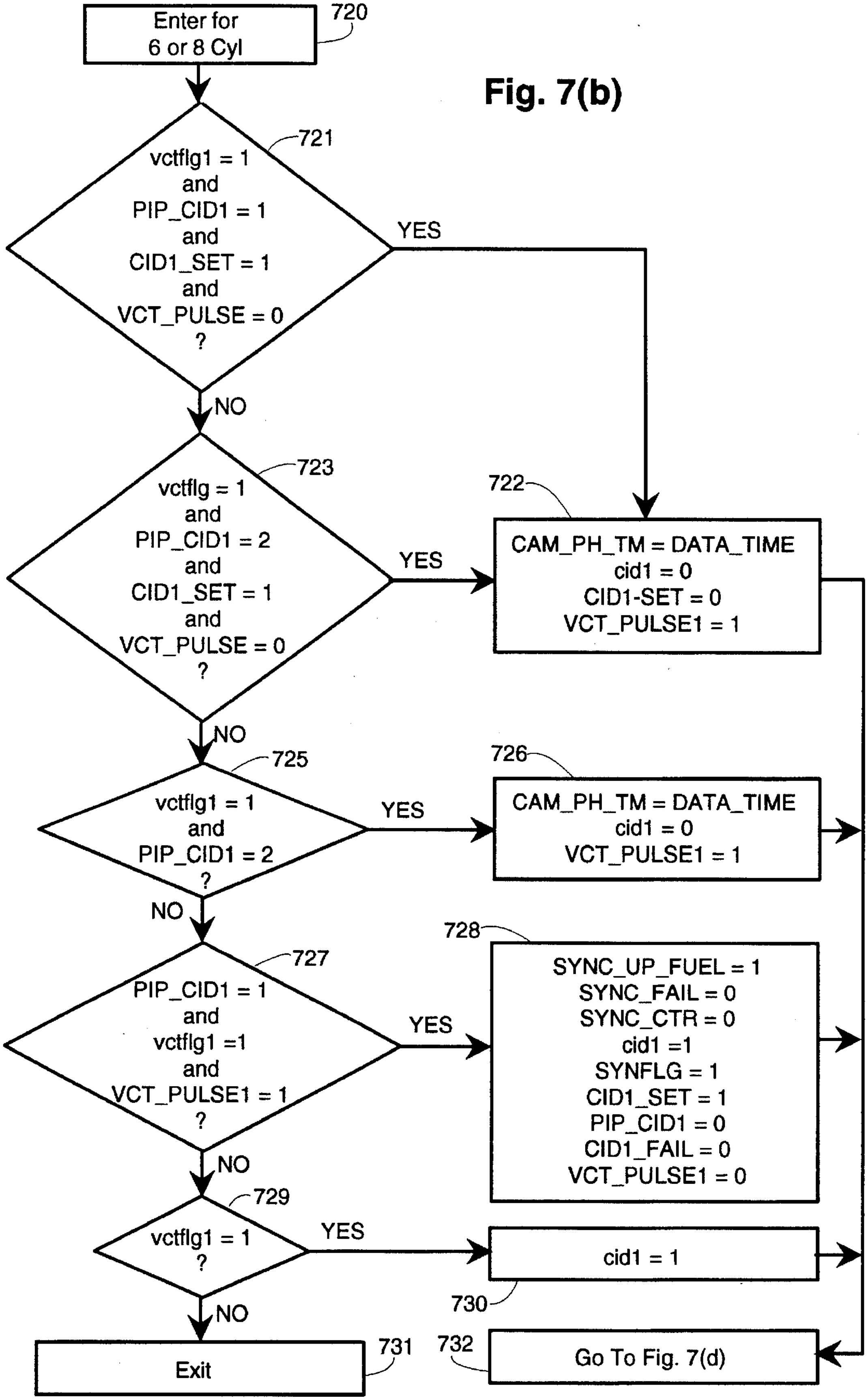
Figure 7C:
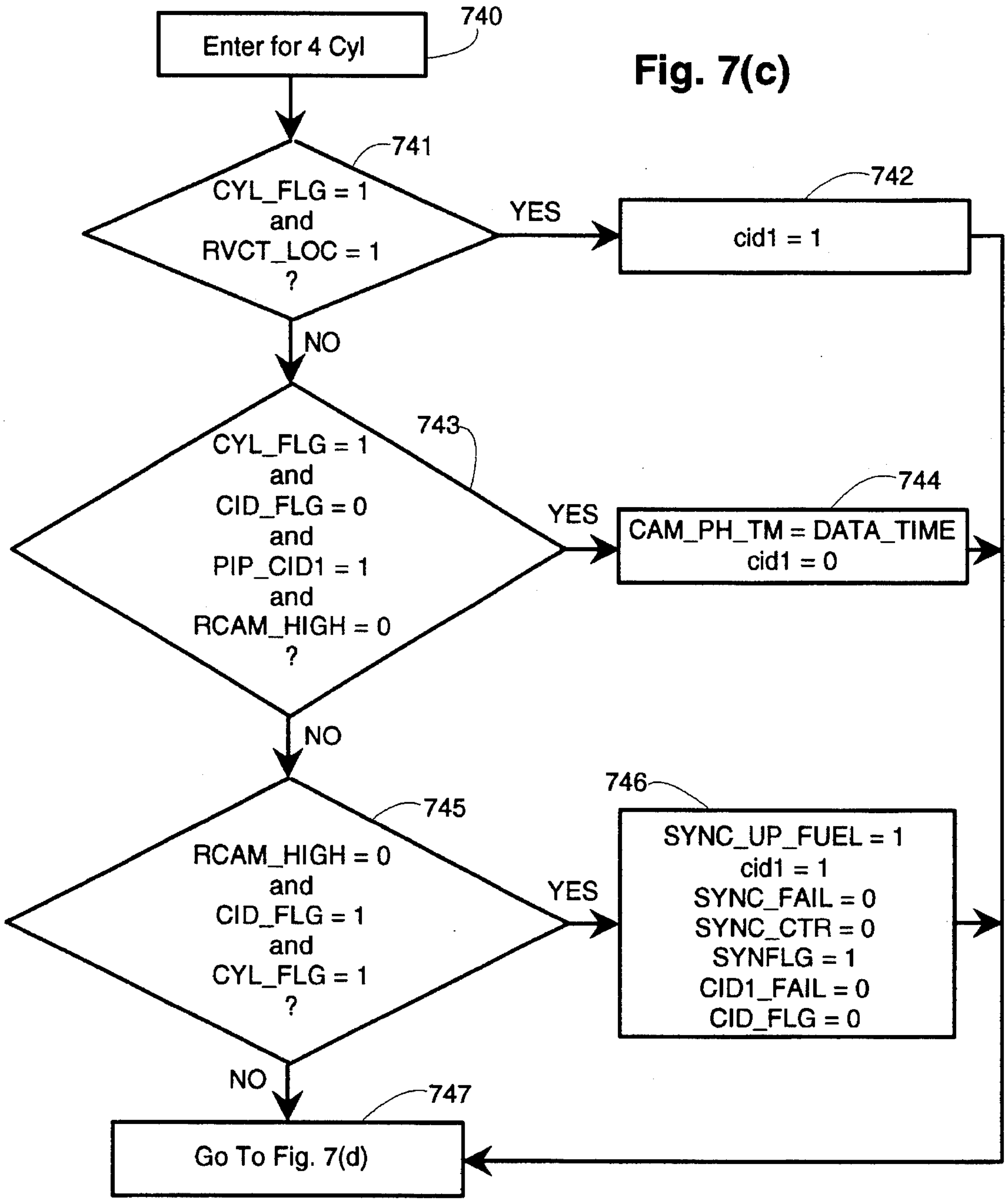
Figure 7D:
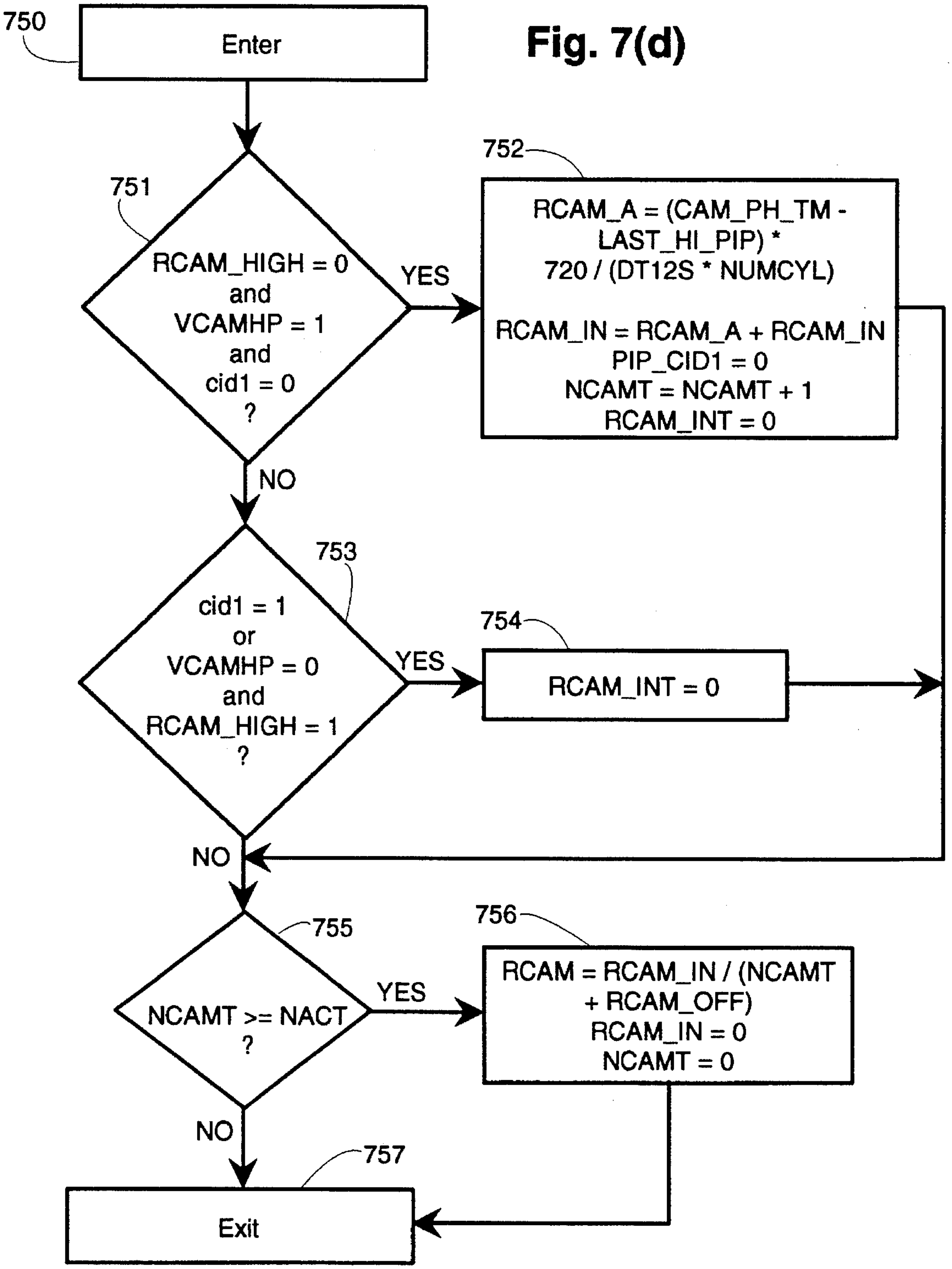
Figure 8A:
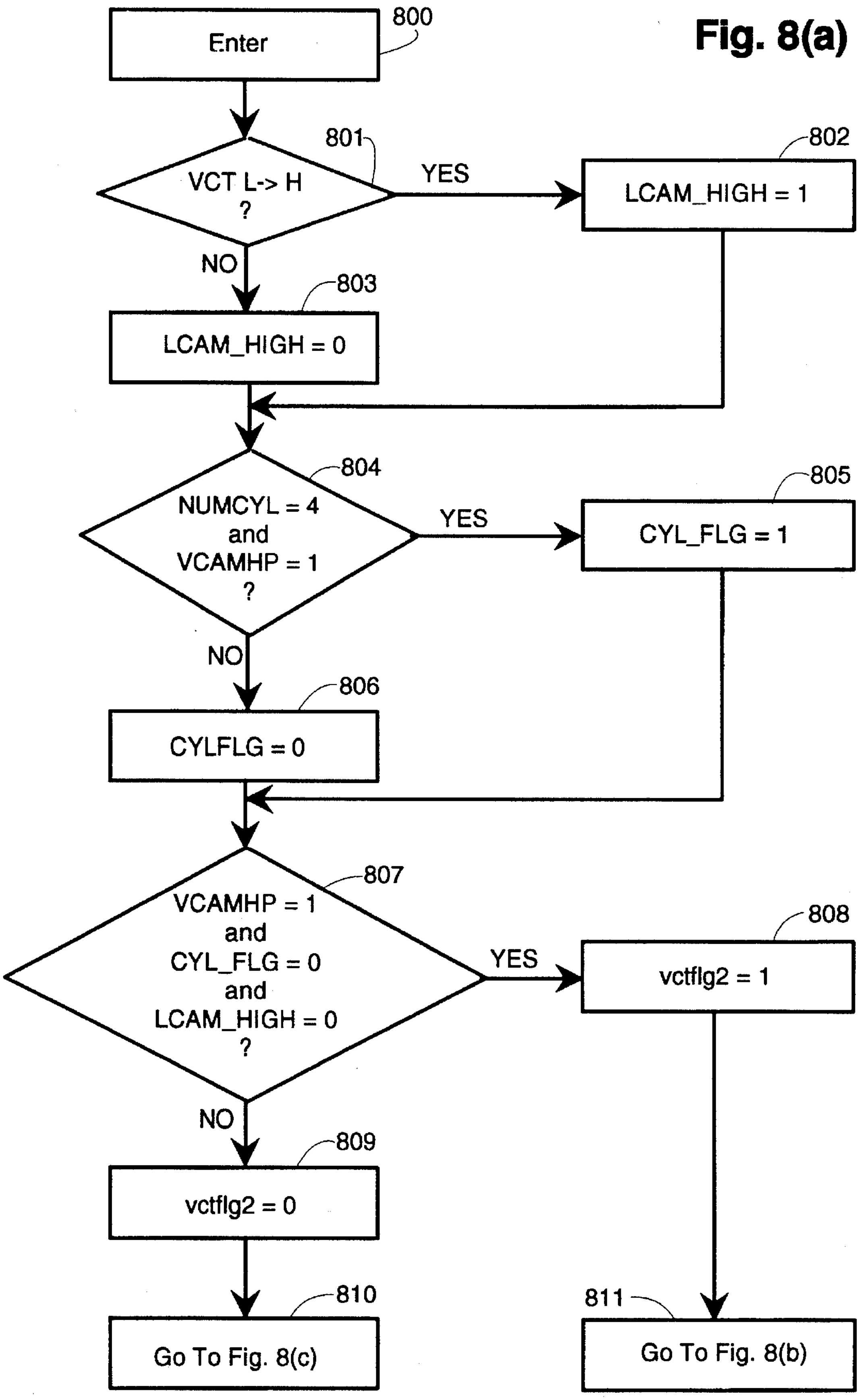
Figure 8B:
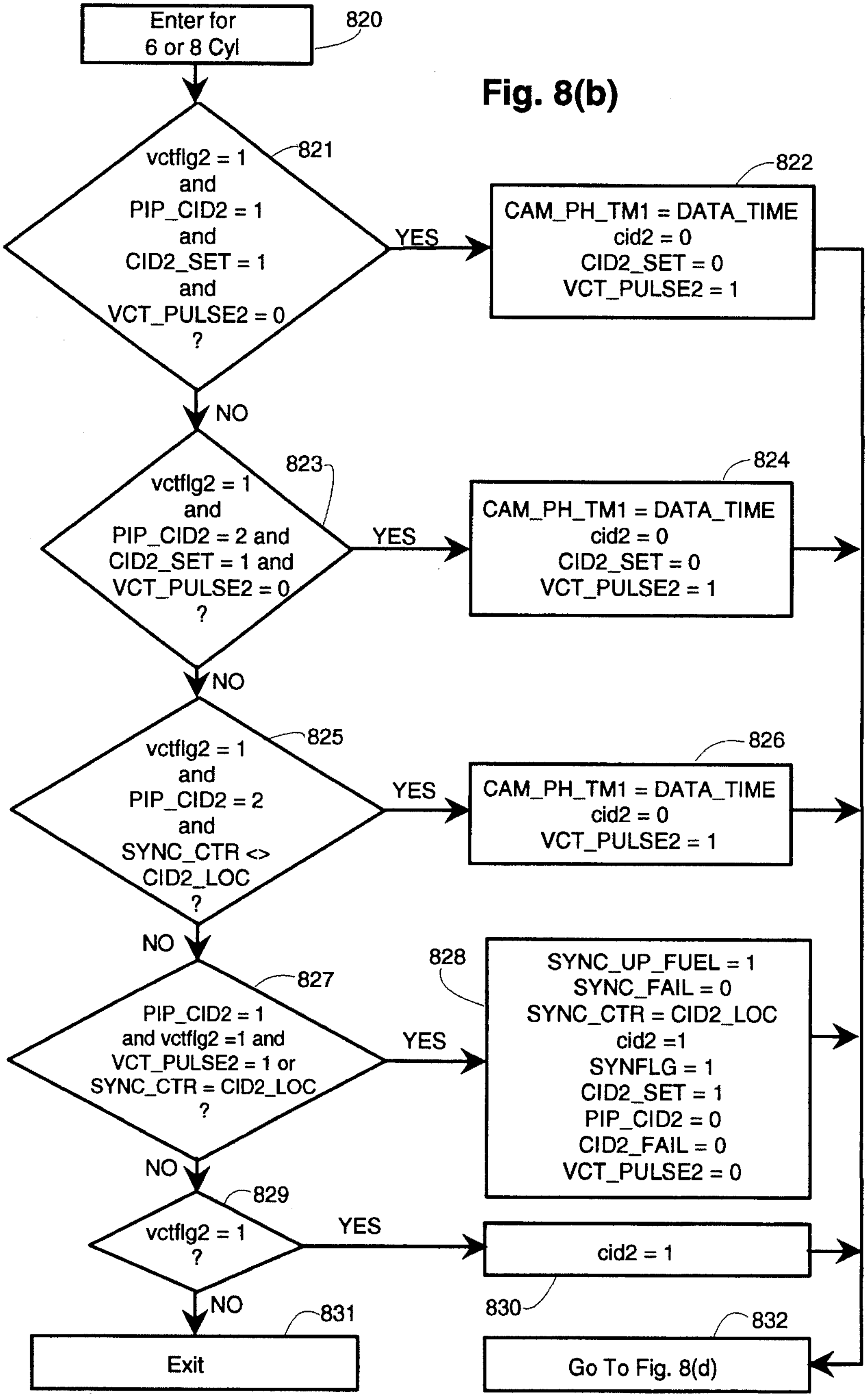
Figure 8C:
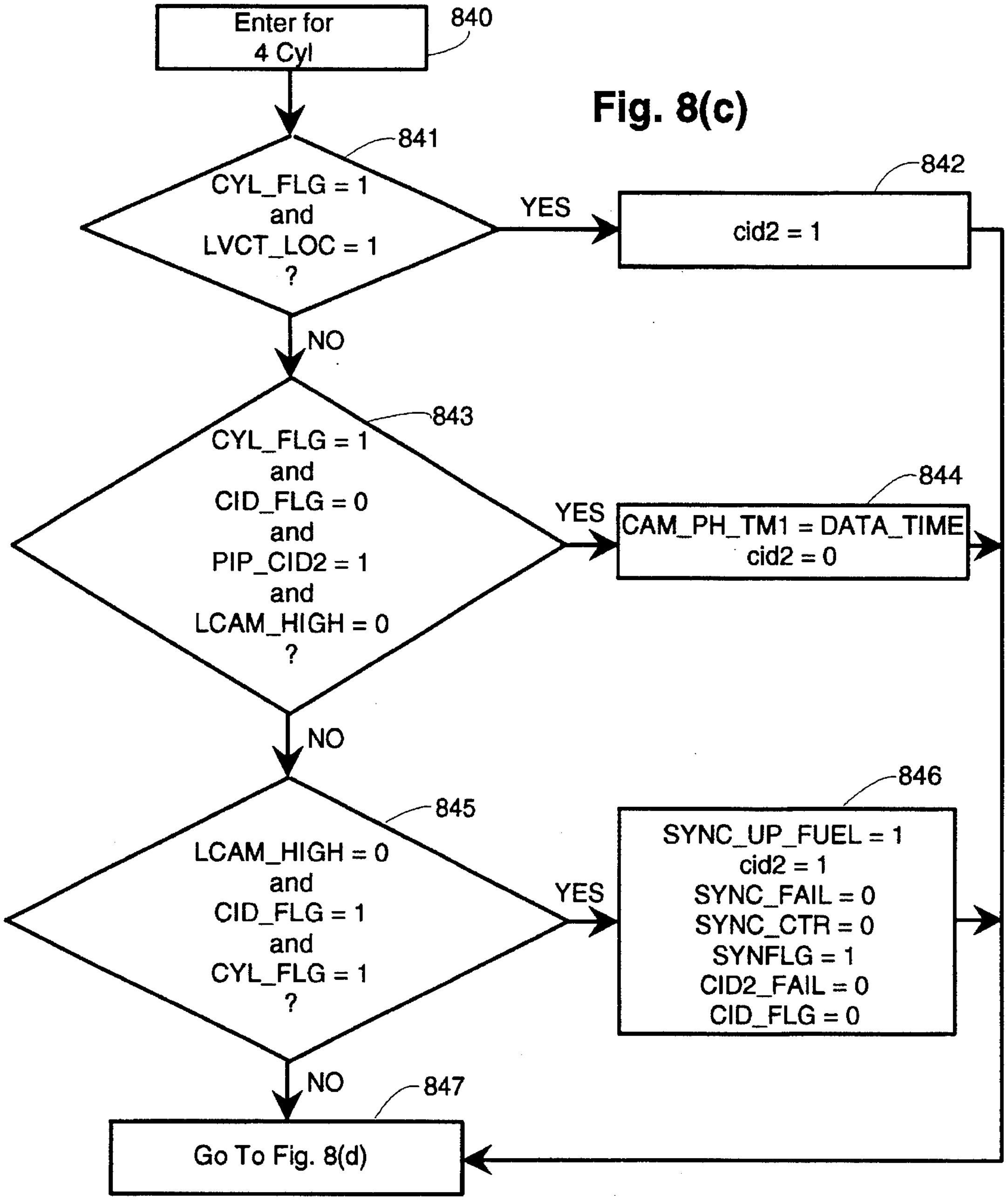
Figure 8D:
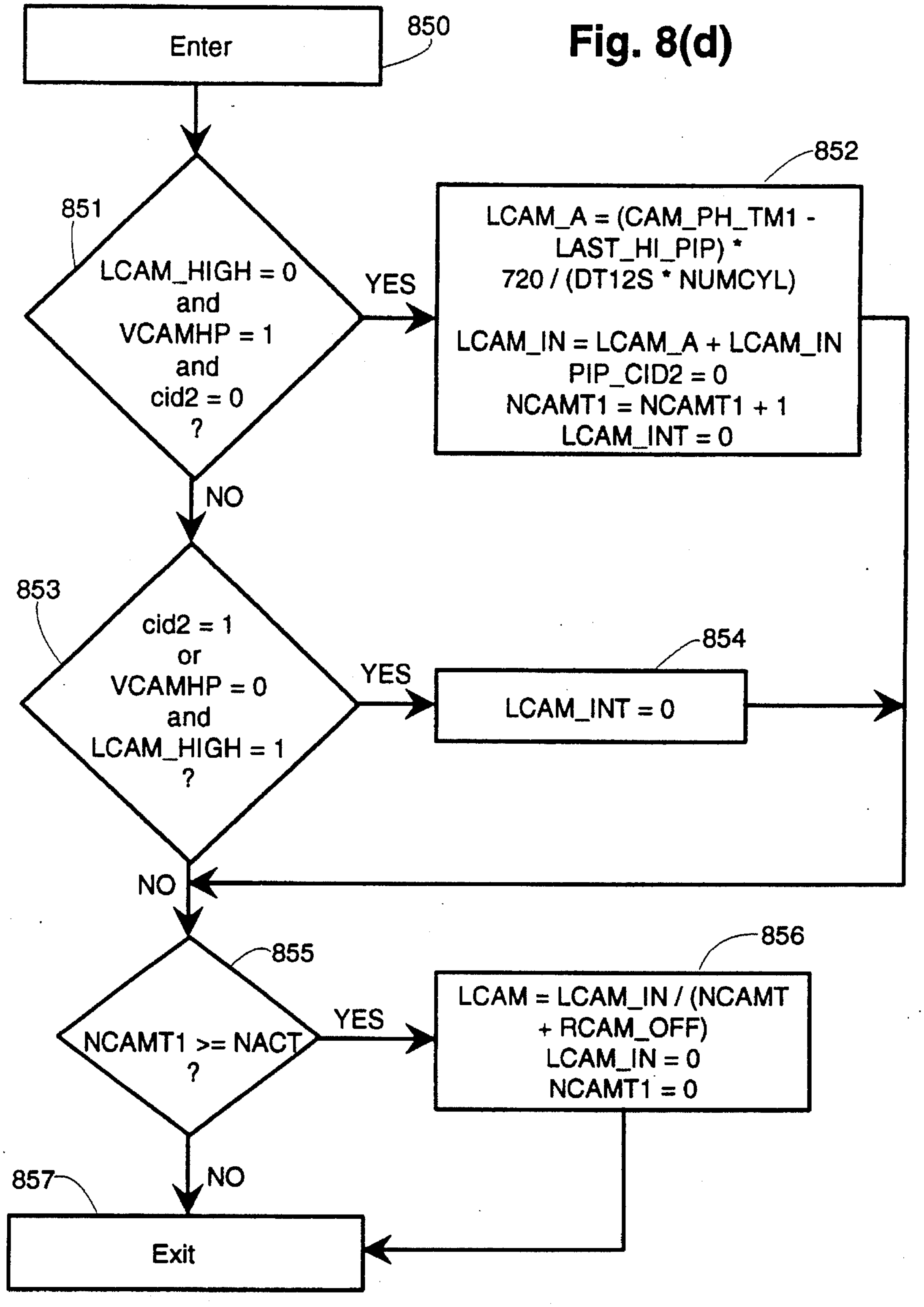

FIG. 6 shows the general steps executed by EEC 10 to identify the VCT/CID pulsetrain and to determine the relative position of the cams 14 on the camshaft 12. FIGS. 7(*a–d*) and 8(*a–d*) show in greater detail the steps shown generally in FIG. 6. At 602, the pulsetrain transmitted via signal line 18 is read by EEC 10 and a determination is made at 603 as to whether the pulse read is a VCT or CID pulse. If the pulse is a VCT pulse then at 604, the tooth transmitting the pulse is identified. At 605, the time duration separating the PIP pulse and the VCT pulse is determined and a VCT angle is determined which is indicative of the positioning of cams 14 relative to crankshaft 15, as measured in degrees. At 606, the VCT angles for the left and right banks are stored and the routine is exited at 607. If at 603, the VCT/CID pulse is identified as a CID pulse then at 609 and 610, bit flag FUEL_IN_SYNC and register SYNC_CTR are set and stored and the routine is exited at 607.

FIGS. 7(*a–d*) show in greater detail the steps executed in FIG. 6 for the right bank of an internal combustion engine. FIGS. 8(*a–d*) show in greater detail the steps executed in FIG. 6 for the left bank of an internal combustion engine. For in-line engine containing either a single camshaft or dual camshafts, either FIGS. 7(*a–d*) or FIGS. 8(*a–d*) will be executed depending upon a calibration value which is set to a predetermined value depending on certain known characteristics of the engine.

At 701 the VCT/CID input is checked to determine if a rising edge transition has occurred and a bit flag RCAM_HIGH is set to a value of one to indicate that a VCT or CID signal had crossed the VCT/CID sensor. At 704, a test is performed to determine if the engine in question is an in-line four-cylinder or a V-type engine comprising six or eight cylinders. If the calibration constant NUMCYL equals four and VCAMHP=1, a bit flag CYL_FLG is set to one at 705 to indicate an in-line engine, and otherwise CYL_FLG is set to zero at 706 to indicate a V-type engine.

At 707, a combination of three conditions is checked to determine if the VCT angle to be computed is for an in-line four or a V-type engine. If VCAMHP equals one and CYL_FLG and RCAM.HIGH equal zero, indicating that the engine is a V-type and a high to low transition of the PIP signal has occurred, then the bit flag vctflg1 is set to a value of one at 708, the logic in FIG. 7(*b*) is executed and the logic in FIG. 7(*c*) is bypassed. Otherwise, vctflg1 is set to zero at 709 and logic in FIG. 7(*c*) is executed for an in-line engine.

FIG. 7(*b*) shows the steps executed after step 711 in FIG. 7(*a*) for a V-type engine. FIG. 7(*c*) shows the steps executed after step 710 in FIG. 7(*a*) for an in-line engine. Steps 721, 723 and 725, contain three separate sets of conditions under which the pulse contained on the VCT/CID signal line 18 will represent the rotation of a VCT tooth past the VRS sensor. Steps 721 and 723 detect the condition where a VCT pulse occurs after a CID pulse. Step 721 detects when a VCT pulse occurs one PIP pulse after a CID pulse (PIP_CID1=1 and VCT_PULSE=0) and step 723 detects when a VCT pulse occurs two PIP pulses after a CID pulse (PIP_CID1=2 and VCT_PULSE=0). If PIP_CID1 is equal to a value of one (at 721) or a value of two (at 723) and if vctflg1, CID1_SET and VCT_PULSE are as shown at 721 or 723, then at 722 register CAM_PH_TM which contains a CAM phase high-to-low transition time for the right CAM bank is set equal to the value contained in register DATA_TIME which contains the current time as determined by a real-time clock contained in EEC 10, bit flag cid1 is set to zero, which indicates that no CID pulse or false signal was received and bit flag CID1_SET which when set to a value of one indicates that the last pulse detected was a VCT pulse is set to one.

If the tests at 721 and 723 fail then at 725 a test is performed to determine whether the pulse detected is a VCT pulse following a VCT pulse. If so, then at 726, CAM_PH_TIME, cid1 and VCT_PULSE1 are set as in step 722. If the test at 725 fails then a check is made to determine if the VCT/CID pulse detected is a CID pulse. If so, then step 728 is executed and the routine is exited at step 732. If the test at 727 fails then step 729 is executed to test bit flag vctflg1. If vctflg1 equal to one, which represents a high to low transition on the VCT/CID pulse and V-type engine at step 729 then an error has occurred with the VCT/CID pulse. Bit flag cid1 is set to one at step 730, to indicate a false signal. Therefore no VCT angle is calculated in FIG. 7(*d*).

FIG. 7(*c*) shows the steps executed after step 710 for an in-line four cylinder engine. At 741, a test is made to determine the state of CYL_FLG and RVCT_LOC. RVCT_LOC is a calibration constant which when set to one disables the execution of the right cam steps for an in-line four engine (step shown in FIGS. 7 (*a–d*). The bit flag cid1 is set to one in step 742 and no VCT angle is calculated in FIG. 7(*d*).

At 743, several conditions are checked to determine if the VCT/CID input was a VCT pulse. If the pulse is determined to be a VCT pulse then at 744, CAM_PH_TM is set to DATA_TIME and cid1 is set to zero. If the test at 743 fails then the VCT/CID pulse is checked to determine if it is a CID pulse, and if so, then the values shown at 746 are set as shown and the steps shown in FIG. 7(*d*) are executed.

FIG. 7(*d*) shows the steps taken by the preferred embodiment to calculate the number of degrees of movement of camshaft 12 relative to crankshaft 15. At 751, bit flag RCAM_HIGH, which is set to a value of one when a VCT transition from low-to-high is detected is checked, along with calibration constant VCAMHP and bit flag cid1, and if the conditions are as shown at 751 then at 752, a value, RCAM_A, which is indicative of the angular position in degrees of the detected VCT input in relation to the PIP pulse, is calculated as shown at 752. The difference between CAM_PH_TM and LAST_HI_PIP represents the time duration between the occurrence of the VCT pulse and the occurrence of the PIP pulse. DT12S represents the period of time between two adjacent rising edges of the PIP pulse, and hence represents engine angular speed, and NUMCYL represents the number of cylinders in the engine. The ratio of time duration is multiplied by 720 degrees to convert to an angular position of the crankshaft. The resulting value is then added to RCAM_IN which represents a running total of angular position in degrees of the detected VCT input in relation to the PIP pulse. Register NCAMT which contains the number of VCT pulses for the right bank is incremented, bit flag RCAM_INT which, when set to zero, indicates that the transition of a VCT/CID pulse for the right bank was completed and the VCT angle was not calculated. RCAM_INT is set automatically by the interrupt routine every transition of the VCT/CID pulse.

If the test at 751 fails, then at 753 the conditions shown are checked and if the test passes, indicating a low to high transition on the VCT/CID pulse or a false signal, no VCT angle is calculated and RCAM_INT is set to zero at step 754. At 755, NCAMT is compared to a constant NACT which represents the number of VCT transitions at which an angular position of the right camshaft will be calculated for use by the EEC 10. If the test at 755 passes then at 756 a value RCAM which indicated the angular position of the right camshaft is calculated as shown and RCAM_IN and NCAMT are set to zero. The steps shown in FIGS. 8(*a*) to 8(*d*) are then performed for the left bank if the engine is a V-type engine.

The steps shown in FIGS. 8(*a*) to 8(*d*) are similar to those described for The steps shown in FIGS. 8(*a*) to 8(*d*) operate similarly to those shown in FIGS. 7(*a*) to 7(*d*). FIGS. 8(*a*) to 8(*d*) are identical to FIGS. 7(*a*) to 7(*d*) with the exception of the below variable substitutions:

| RIGHT CAM | LEFT CAM |
|---|---|
| RCAM_HIGH | LCAM_HIGH |
| vctflg | vctflg2 |
| PIP_CID1 | PIP_CID2 |
| CID1_SET | CID2_SET |
| VCT_PULSE | VCT_PULSE2 |
| CAM_PH_TM | CAM_PH_TM1 |
| cid1 | cid2 |
| vctflg1 | vctflg2 |
| CID1_FAIL | CID2_FAIL |
| RVCT_LOC | LVCT_LOC |
| RCAM_HIGH | LCAM_HIGH |
| RCAM_A | LCAM_A |
| RCAM_IN | LCAM_IN |
| NCAMT | NCAMT1 |
| RCAM_INT | LCAM_INT |
| RCAM | LCAM |
| RCAM_OFF | LCAM_OFF |

In addition, in FIG. 8(*b*) at 825 the variable SYNC_CTR is compared to a constant CID2_LOC for the purpose of identifying the CID tooth location for the left engine bank. CID2_LOC is a calibration constant which corresponds to a particular engine cylinder. If all three conditions are true in step 825, then the VCT/CID pulse is determined to be a VCT pulse and step 826 is executed. At 827, a similar comparison is performed to determine the CID pulse for the left bank and at 828 SYNC_CTR is set equal to CID2_LOC rather than zero as done at 728 in FIG. 7(*b*).

It is to be understood that the specific mechanisms and techniques which have been described are merely illustrative of one application of the principles of the invention. Numerous modifications may be made to the methods and apparatus described without departing from the true spirit and scope of the invention.

What is claimed is:

1. A variable cam timing system for an internal combustion engine comprising, a variable position camshaft comprising a plurality of cams rotating in a variable angular relationship to a crankshaft, means for altering the angular position of said camshaft in relation to said crankshaft, and means responsive to a first signal indicative of the rotational speed of the crankshaft and to a second signal indicative of the angular position of said camshaft for determining the angular position of said camshaft in relation to said crankshaft.

2. The invention as set forth in claim 1 further comprising, a first sensor, responsive to the rotation of said crankshaft, for generating said first signal which comprises a first pulsetrain comprising a first series of pulses indicative of the rotational speed of the crankshaft; and a second sensor, responsive to the rotation of said camshaft, for generating said second signal which comprises a second pulsetrain comprising a second series of pulses indicative of the angular position of the camshaft.

3. The invention as set forth in claim 2 wherein the means for determining the angular position of said camshaft in relation to said crankshaft comprises means responsive to exactly said first and said second pulsetrains for identifying the location of a predetermined cylinder within said engine.

4. The invention as set forth in claim 2 wherein the means for determining the angular position of said camshaft in relation to said crankshaft determines said angular position as a function of a time duration between a selected pulse of said first pulsetrain and a selected pulse of said second pulsetrain and as a function of the rotational speed of the engine and as a function of a value indicative of the number of cylinders in the engine.

5. The invention as set forth in claim 4 wherein the pulsewheel has exactly five teeth.

6. The invention as set forth in claim 4 wherein the pulsewheel has exactly three teeth.

7. The invention as set forth in claim 4 wherein the pulsewheel has exactly four teeth.

8. The invention as set forth in claim 2 further comprising a pulsewheel, mounted to said camshaft, and having a plurality of teeth, each of which causes the generation of a pulse of said second pulsetrain upon rotation past said second sensor, one of said teeth being a cylinder identification (CID) tooth which identifies the location of a first firing cylinder in a predetermined cylinder firing sequence, and the remainder of the teeth being variable cam timing (VCT) teeth used to identify the angular position of said camshaft, and wherein the means for determining the angular position of said camshaft in relation to said crankshaft comprises in combination:

first means for determining if a received pulse is generated by a CID tooth or a VCT tooth;

second means responsive to the received pulse being generated by a VCT tooth for identifying the particular VCT tooth causing the pulse;

means responsive to said second means for calculating a time duration between said received pulse and the most recent received pulse of said first pulsetrain; and means for calculating said angular position of said camshaft as a function of said time duration and as a function of the rotational speed of the engine and as a function of a value indicative of the number of cylinders in the engine.

9. The invention as set forth in claim 2 wherein the means for determining the angular position of said camshaft in relation to said crankshaft further comprises means for determining if the cylinders of the engine are positioned in an in-line configuration or a v-type configuration and means responsive to said determination for determining the angular position of said camshaft in relation to said crankshaft in a first manner if said cylinders are in an in-line configuration and means for determining the angular position of said camshaft in a second manner if said cylinders are in a v-type configuration.

10. The invention as set forth in claim 2 wherein the second sensor is responsive to rotation of a pulsewheel positioned on the camshaft, said pulsewheel comprising a plurality of teeth, the rotation of each tooth past the second sensor causing generation of a pulse in the second series of pulses, the invention further comprising means for identifying the location of a predetermined cylinder within said engine as a function of exactly said first and said second series of pulses within the rotation of three teeth past said second sensor means.

11. In combination, an internal combustion engine comprising a plurality of cylinders, each firing in a predetermined sequence, a variable position cam shaft comprising a plurality of cam lobes, said camshaft rotating in a variable angular relationship to an engine crankshaft, a pulsewheel positioned on said cam shaft comprising a plurality of teeth, a cam position sensor, responsive to the angular rotation of said pulsewheel, for generating a first pulsetrain comprising a series of pulses indicative of the angular positions of said camshaft;

an engine position sensor generating a second pulsetrain comprising a series of pulses indicative of the rotational speed of said engine; and a variable cam sensing system comprising, means, responsive to exactly said first and said second pulsetrains, for identifying a first firing cylinder in a predetermined firing sequence, means, responsive to said first and said second pulsetrains, for determining the time duration between certain pulses of said first and said second pulsetrains, and means, responsive to said time duration, to the rotational speed of the engine and to a value indicative of the number of cylinders in the engine, for determining the angular position of said camshaft in relation to the crankshaft.

12. The invention as set forth in claim 11 wherein the pulsewheel contains three teeth spaced at angles of 90, 90 and 180 degrees angular to one another.

13. The invention as set forth in claim 11 wherein the pulsewheel contains four teeth spaced at angles of 60, 60, 120, and 120 degrees relative to one another.

14. The invention as set forth in claim 11 wherein the pulsewheel contains five teeth spaced at angles of 45, 45, 90, 90 and 90 degrees relative to one another.

15. In an internal combustion engine comprising a variable position camshaft which is movable in a variable angular position in relation to an engine crankshaft, a method for determining the angular position of the camshaft in relation to the crankshaft, comprising the steps of:

generating an engine position signal comprising a first series of pulses indicative of the rotational speed of said engine crankshaft;

generating a cam sensor signal comprising a second series of pulses indicative of the rotation of said camshaft by a predetermined angle; and calculating the angular position of said camshaft in relation to the crankshaft as a function of the relationship between certain pulses of said first series of pulses and certain pulses of said second series of pulses, and as a function of the rotational speed of the engine and as a function of a value indicative of the number of cylinders in the engine.

16. The method as set forth in claim 15 comprising the further step of identifying the location of a first firing cylinder in a predetermined sequence of cylinder firing, as a function of said certain pulses of said first series of pulses and certain pulses of said second series of pulses, within a first rotation of said camshaft.

17. The method as set forth in claim 16 wherein the calculation of the angular position of said camshaft comprises the step of calculating the angular position of said camshaft as a function of the time duration between certain pulses of said first series of pulses and certain pulses of said second series of pulses.

18. The method as set forth in claim 17 wherein the step of calculating the angular position of said camshaft further comprises, detecting the pulses of said engine position signal, detecting the pulses of said cam sensor signal, and identifying a camshaft position upon the detection of a predetermined number of pulses of said engine position signal for every occurrence of a pulse of said cam sensor signal.

19. The method as set forth in claim 17 wherein the calculation of the angular position of the camshaft comprises the further steps of determining if the cylinders of the engine are positioned in an in-line configuration or a v-type configuration and responding to said determination by determining the angular position of said camshaft in a first manner if said cylinders are in an in-line configuration and determining the angular position of said camshaft in a second manner if said cylinders are in a v-type configuration.

* * * * *